United States Patent Office 3,748,334
Patented July 24, 1973

3,748,334
2,6-BIS(TRIFLUOROMETHYL)-4-PYRIDINOLS
Raymond H. Rigterink, Midland, Mich., assignor to The Dow Chemical Company, Midland, Mich.
No Drawing. Continuation-in-part of abandoned application Ser. No. 99,665, Dec. 18, 1970. This application Apr. 12, 1972, Ser. No. 243,411
Int. Cl. C07d 31/28
U.S. Cl. 260—297 R                      4 Claims

ABSTRACT OF THE DISCLOSURE

This invention provides 2,6-bis(trifluoromethyl)-4-pyridinols having the formula:

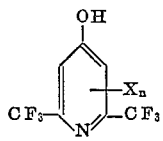

wherein
each X independently represents bromo, chloro or iodo, $n$ represents an integer of from 0 to 2, both inclusive, and the salts thereof. The novel compounds are suitable for use as herbicides and fungicides.

CROSS-REFERENCE TO RELATED APPLICATION

The present application is a continuation-in-part of copending application Ser. No. 99,665, filed Dec. 18, 1970, now abandoned.

SUMMARY OF THE INVENTION

The present invention is directed to a series of novel 2,6 - bis(trifluoromethyl) - 4-pyridinol compounds corresponding to the following formula:

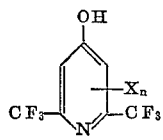

wherein
each X independently represents bromo, chloro or iodo, $n$ represents an integer of from 0 to 2, both inclusive, and the salts thereof.

The compounds of the present invention are crystalline solids at room temperature, of low solubility in water and of varying degrees of solubility in many common organic solvents. It has been found that the novel compounds of the present invention are particularly effective as herbicides and fungicides and are especially adapted to be employed as active toxicants in compositions employed for the control of certain plants and fungal organisms.

The compounds herein contemplated can be prepared by various methods. In preparing the compounds wherein $n$ is 0, a predetermined heptanetrione compound is cyclized to the corresponding pyridinol Compound I by reaction with aqueous ammonia as illustrated:

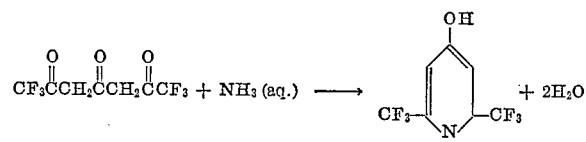

The heptanetrione reactant and aqueous ammonia are contacted in any convenient fashion and the resulting reaction mass is heated, in a closed vessel, for a period of time sufficient to assure substantial completion of the reaction. Generally, the reaction mass is maintained under the pressure of ammonia at the reaction temperature employed for a period of from about 2 to about 8 hours. The reaction proceeds readily at temperatures of from about 100 to about 160° C.; preferably, the reaction mass is heated at a temperature of from about 120 to about 140° C. Following the substantial completion of the reaction, the reaction mass is ordinarily concentrated by evaporation to obtain the ammonium salt of the desired product in crystalline form. Dissolution of the ammonium salt in water with sodium hydroxide and subsequent treatment with concentrated acid, such as, for example, hydrochloric acid, yields the desired pyridinol product. The product thus obtained can be further purified by employing conventional procedures such as washing with a liquid which is a solvent for impurities but not for the product, recrystallization, and the like.

In a further embodiment of the present invention, compounds wherein X represents bromo, chloro or iodo, are prepared by halogenating the pyridinol compound of Formula I above with an appropriate halogenating agent, e.g., $Br_2$, $Cl_2$ or $I_2$. In carrying out the reaction, the pyridinol reactant is dissolved in water with the aid of sodium hydroxide, and the halogenating agent is dispersed through the resulting mixture. The addition of the halogenating agent is carried out, with agitation, over a period of from about 10 to about 25 minutes. The reaction of the pyridinol and halogenating agent is exothermic and the temperature of the reaction mixture can be controlled by external cooling. Following the addition of the halogenating agent, the reaction mixture is agitated for an additional period of from about one-half to two hours. The reaction mixture is then cooled and acidified with concentrated acid, such as, for example, hydrochloric acid, until precipitation of the product from the reaction mixture is complete. The product precipitate thus obtained is removed by filtration and further purified by utilizing conventional techniques as described above.

Also contemplated within the scope of the present invention is the use of salts of 2,6-bis(trifluoromethyl)-4-pyridinols. Salts coming within the purview of this invention include the amine, substituted amine, ammonium, alkaline earth metals, alkali metals and the like. The term "alkaline earth metal" referred to includes calcium and barium while the alkali metals referred to include metals, such as, for example, sodium, potassium and the like.

The substituted amine and ammonium salts referred to in the present specification and claims include, for example, methylamine, ethylamine, dimethylamine, diethylamine, n-propylamine, trimethylamine, ammonium, tetramethylammonium and the like. The desired salts are prepared by treating the prepared pyridinol compound with a sufficient amount, usually equivalent amounts, of the corresponding alkali metal hydroxide, carbonate, etc., ammonium hydroxide and the like or amines as described.

DESCRIPTION OF THE PREFERRED EMBODIMENTS

The following examples merely illustrate the invention and are not to be construed as limiting.

EXAMPLE 1

2,6-bis(trifluoromethyl)-4-pyridinol 1,1,1,7,7,7-hexafluoro-2,4,6-heptanetrione (55.0 grams; 0.2 mole) was mixed with 225 milliliters of 28% aqueous ammonia in a closed vessel and heated, with agitation, at a temperature of about 125–130° C. for a period of about four hours. Following the completion of the reaction, the reaction mixture was concentrated by evaporation over a steam bath until a large quantity of crystals formed. The mixture was cooled and filtered and the brown crystalline solid thus obtained was identified by infrared and nuclear magnetic reasonance as the ammonium salt of the desired product. Elemental analysis calculated for $C_7H_6F_3N_2O$ (percent): C, 33.9; H, 2.42; N, 113. Found (percent): C, 34.4; H, 2.51; N, 11.4. Dissolution of the ammonium salt in water was accomplished by the addition of a sufficient amount of sodium hydroxide. Subsequent acidification of the solution with concentrated hydrochloric acid and cooling gave a tan crystalline precipitate which was filtered off, dried, and recrystallized from toluene. As a result of these operations, there was obtained the desired 2,6-bis(trifluoromethyl)-4-pyridinol compound melting at 141–132° C. Elemental analysis calculated for $C_7H_3F_6NO$ (percent): C, 36.4; H, 1.31; N, 6.1. Found (percent): C, 36.4; H, 1.16; N, 6.2.

EXAMPLE 2

3,5-dichloro-2,6-bis(trifluoromethyl)-4-pyridinol 2,6-bis(trifluoromethyl)-4-pyridinol (6.5 grams; 0.028 mole) was dissolved in 100 milliliters of water containing 50% sodium hydroxide (6.7 grams; 0.084 mole). Chlorine (6.7 grams; 0.06 mole) was bubbled through the resulting mixture with agitation over a period of from about 10 to about 20 minutes. During the chlorine addition, the reaction mixture was maintained at a temperature of from about 25 to about 30° C. by external cooling. The reaction mixture was subsequently treated with a sufficient quantity of 5 N sodium hydroxide in order to dissolve an oily layer formed during the course of the chlorine addition. Agitation of the reaction mixture was continued for a period of about one hour, after which period small quantities of concentrated hydrochloric acid were added until precipitation of solid material ceased. The tan crystalline precipitate thus formed was filtered off, dried, and recrystallized from petroleum ether. As a result of these operations, there was obtained the desired 3,4-dichloro - 2,6 - bis(trifluoromethyl)-4-pyridinol compound melting at 104–106° C.

In a manner similar to that described in Example 2, 3,5-dibromo-2,6-bis(trifluoromethyl)-4-pyridinol (molecular weight of 389) is obtained by using bromine in place of chlorine; and 3,4-diiodo-2,6-bis(trifluoromethyl)-4-pyridinol (molecular weight of 483) is obtained by using iodine in place of chlorine.

The sodium salt of 3,5-dichloro-2,6-bis(trifluoromethyl)-4-pyridinol is obtained by treating the pyridinol compound with an equimolar amount of sodium hydroxide and the ethylamine salt of 3,5-dibromo-2,6-(trifluoromethyl)-4-pyridinol is obtained by treating said pyridinol with an equivalent amount of ethylamine.

The compounds of the present invention are suitable for use as herbicides and fungicides. For such uses, the unmodified substance can be utilized. However, the present invention also embraces the use of compounds in a formulation. Thus, for example, a compound can be dispersed on a finely divided solid and employed therein as a dust. Also, the compounds, or a solid composition comprising the compound, can be dispersed in water, typically with the aid of a wetting agent, and the resulting aqueous suspension employed as a spray. In other procedures, the compound can be employed as a constituent of organic liquid compositions, oil-in-water and water-in-oil emulsions, or water dispersions, with or without the addition of wetting, dispersing, or emulsifying agents.

This is not to suggest, however, that the compounds claimed and compositions containing them are equally effective at similar concentrations or against the same plants or fungal organisms. The exact concentration of the toxic constituent to be employed in the treating compositions is not critical and may vary considerably provided the plants or fungal organisms and/or their habitats are contacted with an effective amount of the toxicant. Good results are obtained when compositions containing controlling herbicidal and fungicidal concentrations, usually from about 500 to 10,000 parts per million by weight of one or more of the compounds, are employed. The concentration of toxicants in liquid compositions generally is from about 1.0 to about 50 percent by weight. Concentrations up to 95 weight percent are often employed. In dusts, the concentration of the toxicant can be from about 1.0 to 10 weight percent; however, concentrations up to 95 weight percent are often conveniently employed. In compositions to be employed as concentrates, the toxicant can be present in a concentration of from 5 to 98 weight percent.

In representative operations, separate compositions containing 500 parts of 2,6-bis(trifluoromethyl)-4-pyridinol and the ammonium salt derivative of the named compound as sole toxicant per million parts by weight of ultimate treating composition were prepared and separately applied to the environments containing and supporting thriving members of one of a variety of fungal organisms. Each compound was found to give complete control and kill of *Staphylococcus aureus, Bacillus subtilis, Mycobacterium phlei* and *Trichophyton mentagrophytes* at the above concentration.

In further representative operations, each of the 2,6-bis(trifluoromethyl)-4-pyridinol and 3,5-dichloro-2,6-bis-(trifluoromethyl)-4-pyridinol compounds gives complete control and kill of pigweed, wild mustard-charlock, crabgrass and bindweed while 2,6-bis(trifluoromethyl)-4-pyridinol additionally controls ragweed, Johnson grass and wild oats when such species are contacted with compositions containing the respective compounds at a concentration of 4000 parts per million by weight.

The 1,1,1,7,7,7-hexafluoro - 2,4,6 - heptanetrione compound used as a starting material in the present invention is obtained by treating acetone and ethyl trifluoroacetate with sodium hydride according to the method of Miles et al., J. Org. Chem. 30, 1007 (1965).

What is claimed is:

1. A compound corresponding to the formula

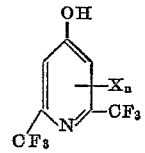

wherein
each X independently represents bromo, chloro or iodo,
$n$ represents an integer of from 0 to 2, both inclusive, and
salts thereof.

2. A compound as in claim 1 which is 2,6-bis(trifluoromethyl)-4-pyridinol.

3. A compound as in claim 1 which is the ammonium salt of 2,6-bis(trifluoromethyl)-4-pyridinol.

4. A compound as in claim 1 which is 3,5-dichloro-2,6-bis(trifluoromethyl)-4-pyridinol.

References Cited

UNITED STATES PATENTS 3,644,388    2/1972    Tomlin et al. _____ 260—297 R
3,682,938    8/1972    Troxel et al. _____ 260—297 R ALAN L. ROTMAN, Primary Examiner U.S. Cl. X.R.

71—94; 424—263